United States Patent [19]

Kano et al.

[11] Patent Number: 5,705,096
[45] Date of Patent: Jan. 6, 1998

[54] UV CROSSLINKING COMPOUND, ALIGNMENT FILM FOR LCD COMPONENT AND LCD COMPONENT

[75] Inventors: Mitsuru Kano, Furukawa; Yoshihiko Ishitaka; Yumiko Sato, both of Sendai; Katsumasa Yoshii, Miyagi-gun; Shigeru Sugimori; Takashi Katoh, both of Osaka, all of Japan

[73] Assignees: Alps Electric Co., Ltd., Tokyo; Chisso Corporation, Osaka, both of Japan

[21] Appl. No.: 618,416

[22] Filed: Mar. 15, 1996

[30] Foreign Application Priority Data

Mar. 15, 1995 [JP] Japan ............................ 7-056356

[51] Int. Cl.$^6$ ............ C09K 19/52; G02F 1/1337; C08F 2/48
[52] U.S. Cl. ............ 252/299.4; 349/93; 349/94; 349/123; 428/1; 252/299.01
[58] Field of Search .......... 252/299.01, 299.4; 428/1; 349/123, 134, 135, 93, 94

[56] References Cited

U.S. PATENT DOCUMENTS

| | | | |
|---|---|---|---|
| 5,385,690 | 1/1995 | Finkelmann et al. | 252/299.01 |
| 5,593,617 | 1/1997 | Kelly et al. | 252/299.67 |

Primary Examiner—Shean C. Wu
Attorney, Agent, or Firm—Darby & Darby

[57] ABSTRACT

The UV crosslinking compound of the present invention is characterized in having the following chemical formula, and has high photosensitivity. Accordingly, the crosslinking reaction can be accomplished within a short period of time. Thus, if this compound is employed in the alignment film for a LCD component, it becomes possible to carry out a sufficient alignment treatment with UV irradiation over a short period of time. Accordingly, production time can be shortened and production costs reduced.

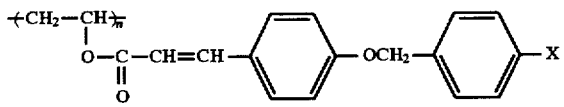

wherein, n is an integer, and X is an atom selected from among F, Cl, Br, I and CN.

3 Claims, 6 Drawing Sheets

THE FIRST DIRECTION

PVCn-F

FIG.8

PVCn-Cl

UV CROSSLINKING COMPOUND, ALIGNMENT FILM FOR LCD COMPONENT AND LCD COMPONENT

BACKGROUND OF THE INVENTION

1. Field of the Invention

The present invention relates to a liquid crystal display (LCD) component in which the liquid crystal molecules are aligned in a specific direction such that all varieties of display are carried out, to an alignment film that is provided inside the LCD component, and to a novel compound suitable for this alignment film.

2. Description of the Related Art

There has been increasing demand in recent years for lighter, thinner and more energy conservative displays of a variety of types such as those used in image devices attached to televisions, computers or the like. Accordingly, the development of a superior LCD component for realizing a flat display which would satisfy these conditions was eagerly awaited.

An alignment film which is provided with a pretilt angle by inclining the surface thereof is provided to an LCD component for the purpose of aligning the liquid crystal in a specific direction.

Known methods may be employed to produce this alignment film, including a rubbing treatment wherein a high molecular resin film such as polyimide or the like formed on top of a base is rubbed in a single direction with a cloth, and a method wherein the alignment film is formed by oblique vacuum evaporation of $SiO_2$.

However, in the case of alignment films formed by employing a rubbing treatment, such problems occur as the generation of static electricity or dust during the rubbing treatment with a cloth to form the alignment film.

Further, in the case of the method employing oblique vacuum evaporation, manufacturing costs not only higher, but the method is difficult to employ for large surface areas. Thus, this method is not suitable for the formation of relatively large LCD components.

Accordingly, in recent years, a method wherein alignment film is produced by employing a transfer method has attracted much attention as a means by which to resolve the aforementioned problems. In this method, a transfer mold having a surface on which a pattern of convexities and concavities is formed is pressed into a resin film formed to a base as the resin film is heated. The pattern of convexities and concavities is transferred to the surface of the resin film, thereby form the film. In general, the surface of an alignment film produced using this transfer method is formed such that numerous convexities are repeated approximately in parallel across the base.

However, in a LCD component employing an alignment film wherein the convexities and concavities have been formed by the transfer method, the LC has poor interface control strength. Thus, there is a concern that the LCD component will not be able to maintain a sufficient pretilt angle (generally, 1° or more) and a so-called "domain", i.e. a region in which the alignment direction of the liquid crystal are not regulated partly, will occur under subject of an external force or heat.

In addition, in recent years, research has been carried out on a method of producing alignment film as a non-isotropic network polymer. In this method, a high molecular compound (polyvinyl-p-methoxy-cinnamate: abbreviated as PVMC hereinafter), which consists of polymerized monomers and is indicated by the following chemical formula (1), is coated uniformly onto a base to form a film. Then, the film is irradiated with ultraviolet (UV) light polarized in a specific direction, with only those photosensitive groups in the PVMC which are aligned in the direction of polarization of the irradiating UV becoming crosslinked to form the non-isotropic network polymer.

[chemical formula 1]

Unlike other methods such as that employing a rubbing treatment in which contact between the resin film coated on the base and another material is essential, this method is a non-contact method. Thus, it offers advantages in that there is no generation of static electricity nor introduction of impurities.

However, the resin employed in this method has weak photosensitivity. Thus, in order to carry out alignment sufficient for an alignment film for an LCD component, lengthy irradiation with polarized UV is necessary. Accordingly, this extends the production process. In other words, if the alignment treatment terminated in an amount of time which is suitable from a manufacturing perspective, the liquid crystal alignment of the LCD component produced is insufficient, resulting in a low dichromatic ratio and poor contrast.

It is believed that this phenomenon occurs for the following reason. Namely, whereas photosensitive groups in a polymer must be able to move freely in order for them to align in the direction of polarization, in the case of PVMC, the photosensitive groups are only inside the polymer. Thus, the photosensitive groups are restrained by the main chain of the polymer, and hindered from moving rapidly. Accordingly, a long period of time is required to form the network polymer.

Moreover, the relative interaction between the liquid crystals is poor, and it is difficult to obtain a uniform alignment. Thus, numerous narrow domains may arise.

Further, the pattern on the surface of the alignment film is only weakly maintained, so that upon injection of the liquid crystal, the pattern may align in the direction of injection.

SUMMARY OF THE INVENTION

Accordingly, the present invention was conceived in order to resolve the aforementioned problems, and has as its objective the provision of an alignment film provided with a sufficient pretilt angle which can be produced at low cost within a short period of time, while avoiding the generation of dust and static electricity during the production process.

It is also the present invention's objective to provide a LCD component provided with this alignment film and a UV crosslinking compound which enables realization of the aforementioned alignment film and LCD component.

The UV crosslinking compound of the present invention is characterized in having the following chemical formula (2):

[chemical formula 2]

Wherein, n is an integer, while X indicates an atom selected from among F, Cl, BF, I and CN.

For example, when X is F, the compound is referred to as polyvinyl-4-(4-fluorobenzyloxy)cinnamate while when X is Cl, the compound is referred to as polyvinyl-4-(4-chlorobenzyloxy)cinnamate.

The present invention's alignment film for an LCD component is characterized in consisting of a high molecular compound indicated by the following chemical formula (3):

[chemical formula 3]

Wherein, n and n' are integers, while X is an atom selected from among F, Cl, Br, I and CN.

This high molecular compound is formed by means of UV crosslinking of the UV crosslinking compound indicated by chemical formula (2) above.

The LCD component of the present invention is characterized in the provision of an alignment film consisting of the high molecular compound having the following chemical formula (3).

[chemical formula 3]

Wherein n and n' are integers, and X indicates an atom selected from among F, Cl, Br, I and CN.

This high molecular compound is generated as a result of UV crosslinking of the UV crosslinking compound indicated by the chemical formula (2) above.

Figure 7:
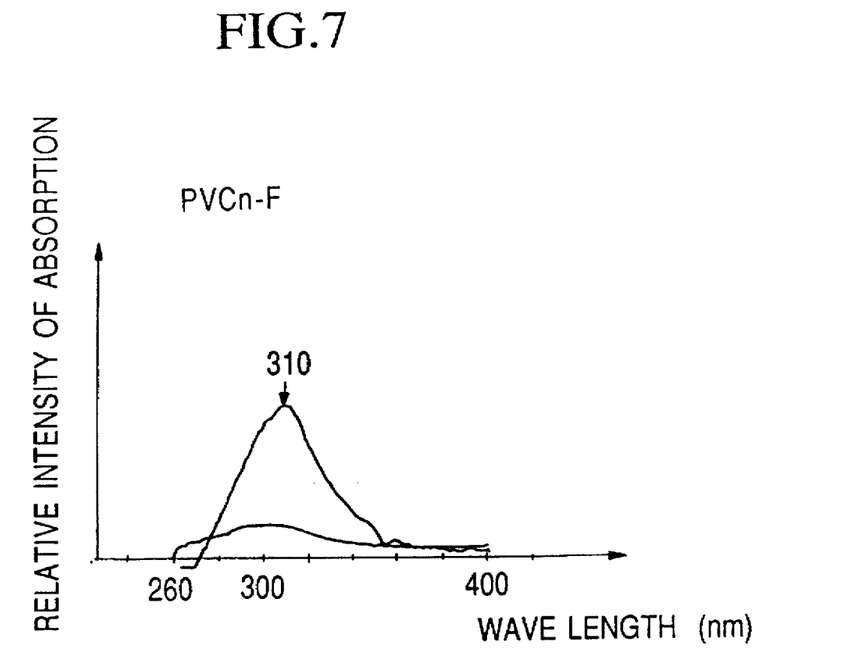
FIG. 7 is a graph showing the relationship between wavelength and the relative intensity of absorption.
Figure 8:
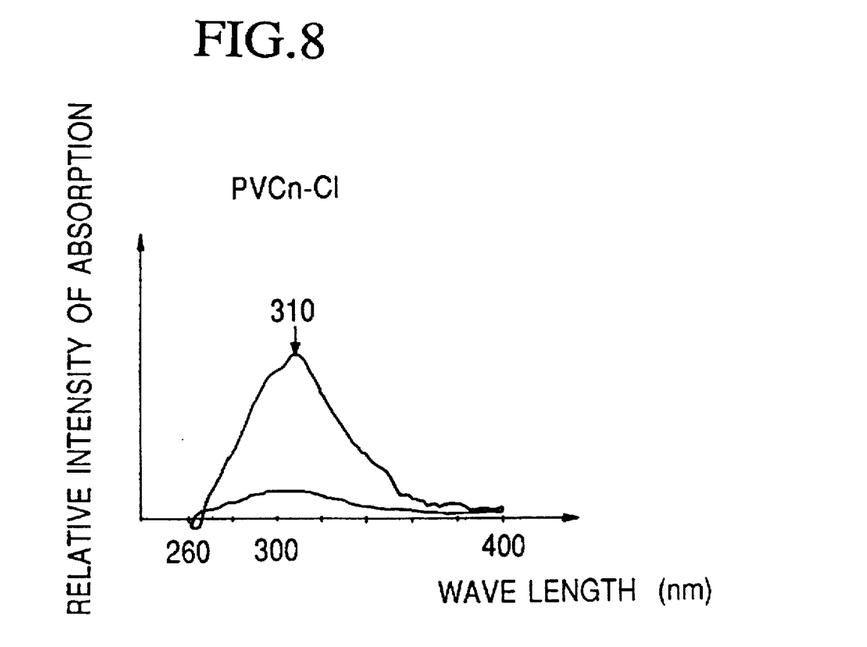
FIG. 8 is a graph showing the relationship between wavelength and the relative intensity of absorption.

In the case of conventional PVMC, the absorption wavelength is centered around 305 nm (see Jpn. J. Appl. Phys. 31 (1992) 2155–2164). Further, the molar absorption coefficient is $0.45 \times 10^7$. In contrast, the absorption wavelength of the present invention's UV crosslinking compound is centered around 310 nm, as shown in FIGS. 7 and 8, with a molar absorption coefficient of from $0.56 \times 10^7$ when X=F, to $0.66 \times 10^7$ when X=Cl.

Figure 6:
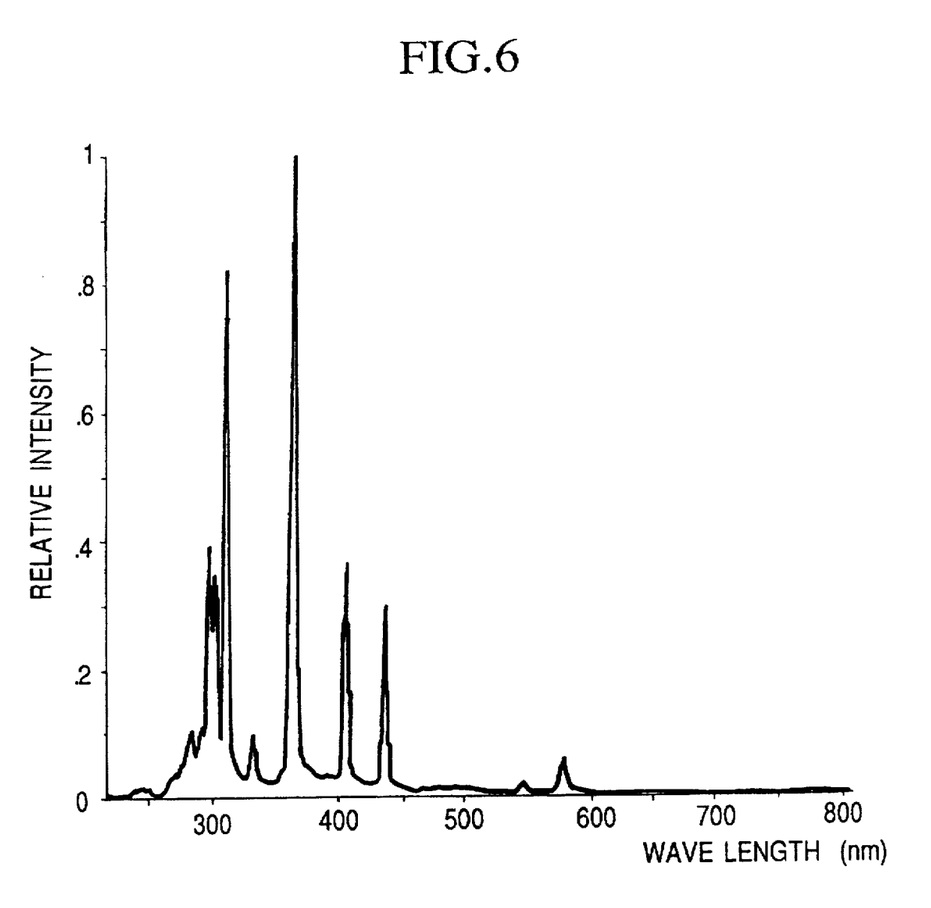
FIG. 6 is a diagram showing the emission wavelength spectrum of the high pressure mercury lamp.

In general, the emission wavelength of a high pressure mercury lamp employed as a UV emitter has a peak at 310 nm, as shown in FIG. 6. Accordingly, in the case of the UV crosslinking compound of the present invention, the photosensitivity is extremely high since the compound reacts optimally under the UV emitted from the UV emitter and also has a high absorption coefficient.

Accordingly, the crosslinking reaction can be accomplished within a short period of time. Thus, if this compound is employed in the alignment film for a LCD component, it becomes possible to carry out a sufficient alignment treatment with UV irradiation over a short period of time. Accordingly, production time can be shortened and production costs reduced. In other words, the LCD component employing the alignment film using the UV crosslinking compound of the present invention has a stronger regulation of LC alignment and an improved dichromatic ratio as compared to conventional LC components produced by means of irradiation of an equivalent duration.

Further, in the case of the alignment film of the present invention, the interaction between the liquid crystals is strong, making it possible to obtain uniform alignment of the liquid crystals. Thus, the generations of domains can be controlled.

Moreover, because the shape of the convexities and concavities formed on the surface of the alignment film is strongly held, a sufficient pretilt angle can be maintained even under application of external force or heat. Thus, the generation of domains can be controlled. In particular, even during the LC injection step, the state of alignment of the alignment film is not easily damaged, making it possible to obtain a uniform alignment across the surface of the alignment film.

Moreover, since the alignment treatment can be accomplished merely by irradiating with polarized UV, production is simple and yield is improved. Moreover, unlike rubbing treatments, this is a non-contact method, so that it is possible to prevent the generation of static electricity or the introduction of impurities.

In addition, a transfer method in which a transfer mold is impressed can be employed together with the technique of irradiation with polarized UV. Although, in this case, a contact method results, the method enables the alignment process to be carried out with greater surety, improving the dichromatic ratio.

In the case where the transfer method is also employed, the direction of polarization of the irradiating polarized UV light must be in a direction almost perpendicular to the direction of repetition of the convexities which were formed by the transfer mold in a previous step.

The UV crosslinking compound of the present invention has the unique chemical structure as described above, and is highly photosensitive to UV. As a result, the crosslinking reaction can be carried out over a short period of time. Accordingly, in addition to alignment film for LCD components, this compound is also effective for use in photoresists and the like.

Moreover, when this UV crosslinking compound is irradiated with polarized UV, a crosslinking reaction which is non-isotropic with rest to a specific direction occurs, making the UV crosslinking compound particularly ideal for use as an alignment film for LCD components.

DETAILED DESCRIPTION OF THE PREFERRED EMBODIMENTS

The present invention's alignment film and the production method therefore can be appropriately applied to a variety of LCD components provided with alignment film.

Figure 1:
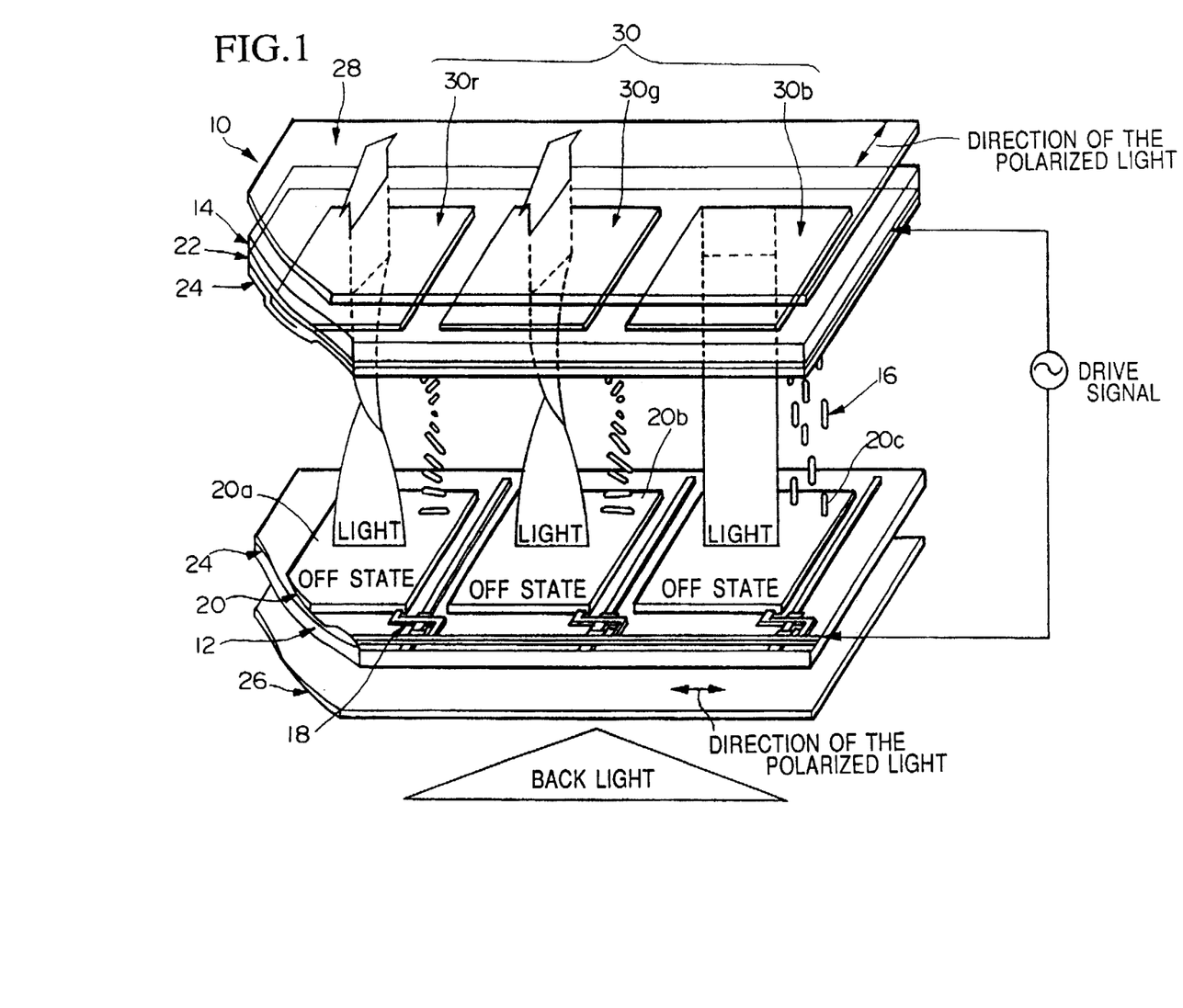
FIG. 1 is an oblique view showing one example of a LCD component.

FIG. 1 shows an example of a LCD component. The color LCD component 10 shown in this figure is comprised in the main of a pair of bases 12, 14 disposed in opposition to one another; a LC 16 enclosed between the pair of bases 12, 14; a LC drive component 18 which is formed to one base 12; a transparent electrode (pixel electrode) 20 (20a, 20b, 20c) which is connected to LC drive component 18; a counter electrode 22, which is formed to the other base 14 opposing transparent electrode 20; alignment films 24, 24 which hold LC 16 there between; an upper polarizing filter 28 and a lower polarizing filter 26 which Are formed to each of the pair of bases 12, 14; and color filter 30 (30r, 30g, 30b) which is formed to base 14.

A material which is typically employed in a LCD component can be suitably used for bases 12, 14. For example, in addition to a glass base, ceramic bases or bases of other types of materials may be employed. Further, a base which has a shape suitable to the LCD component to be product may be employed. For example, a base of a rectangular or other optionally selected shape may be employed.

The state of alignment of the molecules in LC 16 can be varied according to the voltage impressed. For example, in the TN-type LC shown as an example in FIG. 1, a molecular array which is twisted at 90° when there is no voltage impressed, straightens out, with the twists disappearing, upon impression of voltage.

Further, although not shown in FIG. 1, a spacer consisting of microparticles or the like is interposed between alignment films 24, 24. The interval of space in which the LC is enclosed is maintained at specific length by means of this spacer.

A thin film transistor (TFT) or the like may be suitably employed in the LC drive component 18, and the voltage impressed on the LC controlled by means of a drive signal.

Transference electrode 20, which forms a pair with counter electrode 22 formed to the other base 14, impresses a voltage from LC drive component 18 on LC 16. In general, an ITO (Indium-Tin-Oxide) film or the like is employed for transparent electrode 20.

Further, LC drive component 18 and transparent electrode 20 (20a, 20b, 20c) can be provided to each pixel. However, in general, counter electrode 22 is formed as a common electrode shared by each pixel.

LC 16 is disposed in a specific direction in alignment film 24. In this example, a high molecular compound, polyvinyl-4-(4-fluorobenzyloxy)cinnamate, which has been irradiated with UV polarized in a specific direction is employed in alignment film 24.

Polarizing filters 26, 28 are films which radiate lineally polarized light. The lower filter 26 and the upper filter 28 which are formed to each of the bases 12, 14 are provided in the LCD component 10 shown in the figures so that the directions of the polarized light radiating from each filter differ from each other by 90°.

Color filter 30 is employed in a color LCD component. Ordinarily, three color filters, red, green and blue, are employed for each pixel, to form one set. By combining these three colors in the color LCD component, a variety of colors can be realized.

In the color LCD component shown in FIG. 1, light from below the lower polarizing filter 26 passes through the lower polarizing filter 26 as back light. In this case, only light polarized in the horizontal direction indicated in FIG. 1 passes through lower polarizing filter 26.

In the example shown in FIG. 1, the LC drive components 18, 18 are controlled so that no electric current flows through transparent electrodes 20a and 20b, with a voltage impressed only on the liquid crystal above transparent electrode 20c.

In this state, only the polarized light which has passed through lower polarizing filter 26, glass base 12 and alignment film 24 and is in alignment with the twisted liquid crystal molecules above transparent electrodes 20a and 20b, passes through the upper polarizing filter 28 after conversion of its direction of polarization.

In this case, by providing color filters 30r, 30g and 30b which transmits red only, green only, and blue only, respectively, so as to be opposite each of the transparent electrodes 20a, 20b, and 20c, only red and green light, and not blue light, pass through upper polarizing filter 28. Thus, a yellow display results.

The alignment film in this example is produced by coating a solution in which polyvinyl-4-(4-fluorobenzyloxy) cinnamate has been dissolved onto a base 12 provided with a transparent electrode 20. After removing the solvent to form the film, the film is irradiated with UV polarized in a specific direction, thereby providing non-isotropy to the surface of the film.

In addition, if the film is irradiated with non-polarized, isotropic UV prior to irradiation with polarized UV, the distance between reaction units (i.e., the distance between C=C bonds) is shortened, thereby further promoting the reaction.

The method of coating the high molecular compound employed in the present invention's alignment film to the base is not particularly limited. For example, suitable methods include spin coating, screen printing or offset printing.

Moreover, the high molecular compound film can be formed by drying in a baking treatment as required for removal of the solvent, etc.

In this case, pre-baking and baking treatments can be performed to the high molecular compound film as necessary. In carrying out pre-baking and baking treatments, for example, the base is heated for 30 sec. at 80° C., and then heated for 1 hour at 180° C. Moreover, after first preheating the base at 80° C., the screen printing method may be applied to the base, followed by coating of the solution, and then baking.

Further, in the case of coating the solution by means of a screen printing method, coating can be carried out by moving a printing stage at a specific speed, 10 cm/sec for example, in the horizontal, vertical or perpendicular direction of the base via a screen disposed on the base.

The thickness of the high molecular compound film formed by coating the present invention's unique high molecular compound on a base is preferably around 0.1 μm.

Further, a transfer method wherein a transfer mold is pressed into the surface of the film can also be employed together the irradiation of polarized UV.

In the case where a transfer method is also employed, the direction of polarization of the irradiated polarized UV must be that which is almost perpendicular to a first direction, which is the direction in which the convexities formed by the transfer mold in a previous step are repeated.

Figure 2:
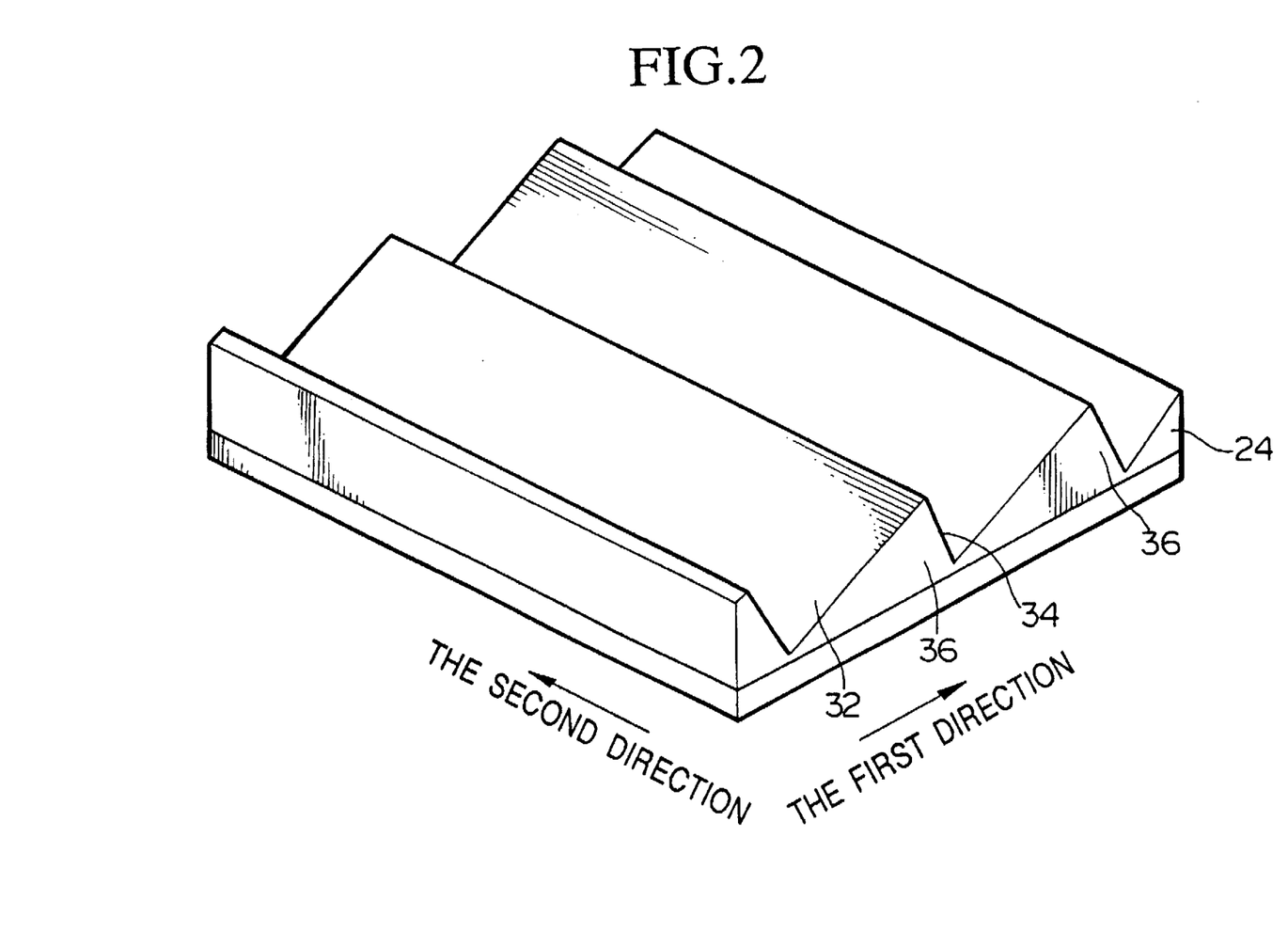
FIG. 2 is an oblique view showing one example of the alignment film of the present invention.

In other words, with reference to FIG. 2 which shows one example of the shape of the alignment film, numerous convexities 36, 36 . . . , which are approximately triangular in cross-section and have a long side 32 and a short side 34, are repeatedly formed along the first direction. UV light having a direction of polarization which lies along a second direction which is almost perpendicular to the first direction is irradiated.

Figure 3:
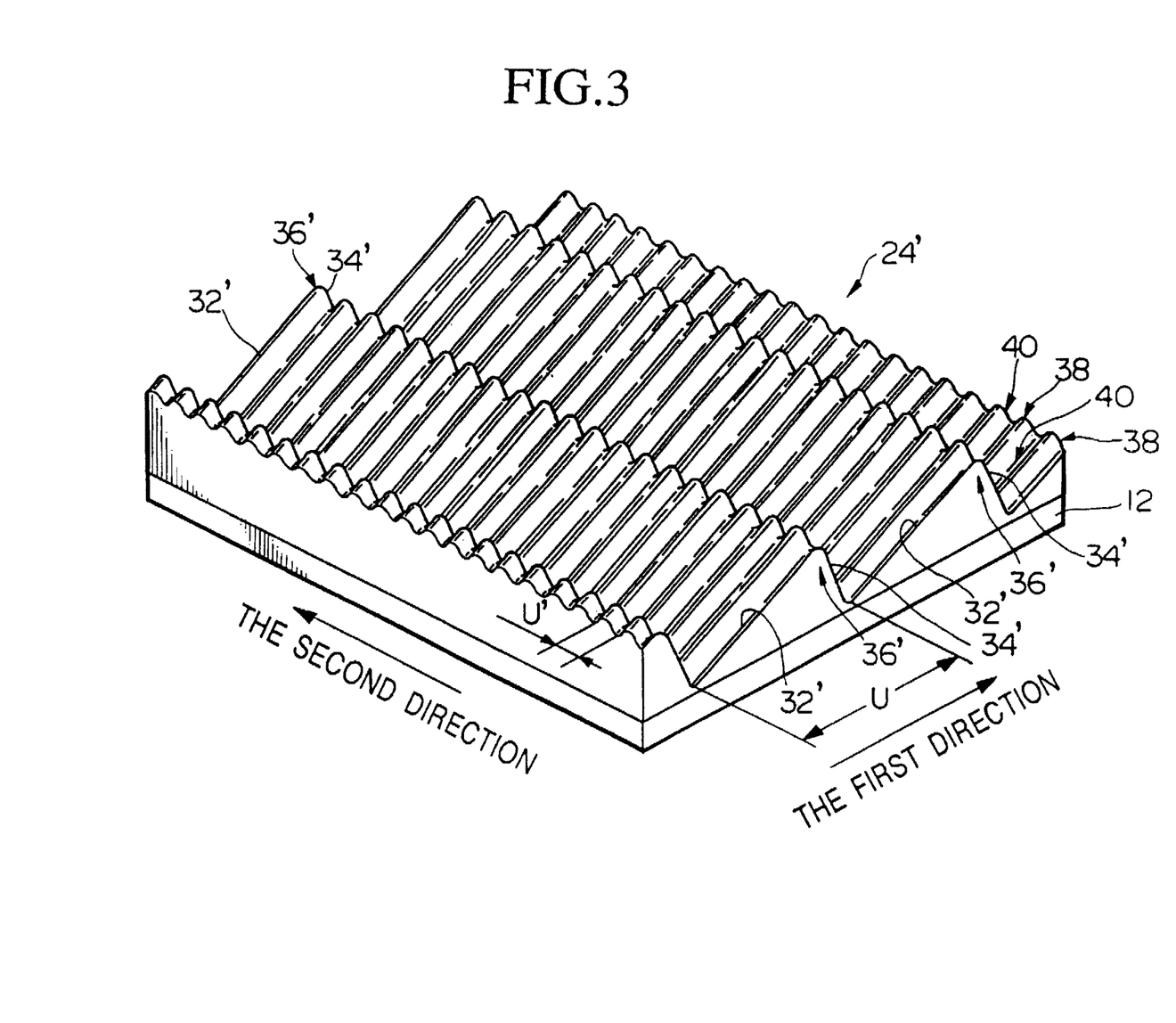
FIG. 3 is an oblique view showing one example of the alignment film of the present invention.

Further, the surface of an alignment film formed using a transfer mold may have a shape such as shown in FIG. 3. Namely, this surface has concavity-convexity arrays having numerous convexity 36' formed along the first direction at unit intervals of length U. The concavity-convexity arrays consist of ridge-shaped arrays 38 and trough-shaped arrays 40 formed alternately with each other. Each convexity 36' has a long side 32' and a short side 34'. The trough-shaped arrays 40 are lower in height than the ridge-shaped arrays. In addition, this surface has a concavity-convexity array formed along the second direction, which is approximately perpendicular to the first direction, at unit repetition intervals of U', which is shorter in length than U. In the case of such an alignment film, polarized UV is irradiated in the second direction.

It is preferable that the length of the unit of repetition U of the concavity-convexity arrays along the first direction be 50 μm or less, while the length of the unit of the repetition U' of the concavity-convexity arrays along the second direction be 3 μm or less. Further, it is even more preferable if the unit of repetition U has a length of 20 μm or less, and the unit of repetition U' has a length of 1.2 μm or less.

Figure 4:
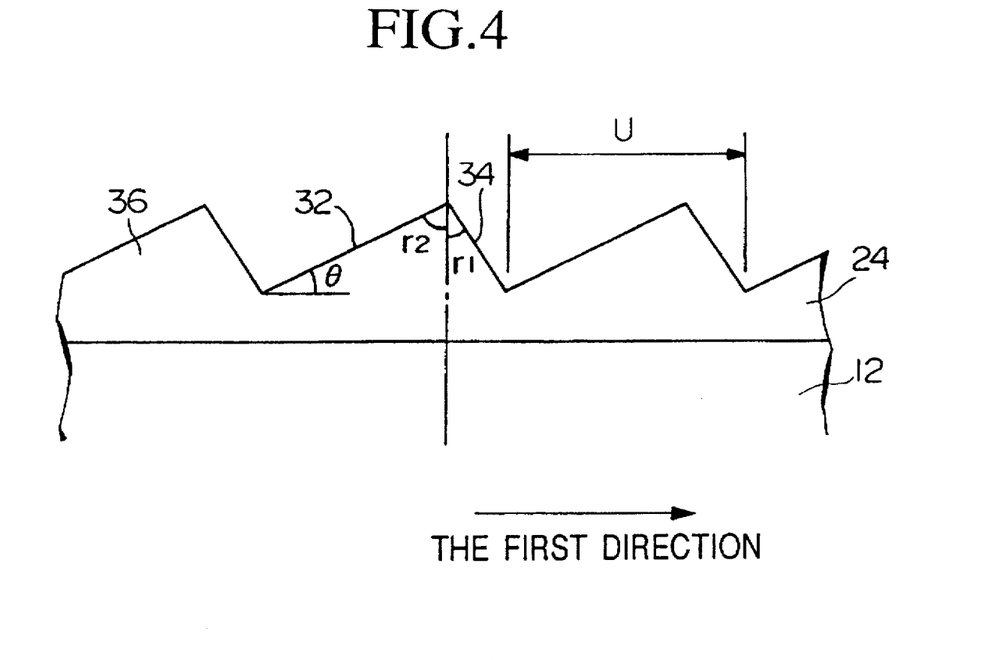
FIG. 4 is a lateral view of an example of the array of convexities and concavities.

Furthermore, as shown in FIG. 4, it is desirable that the angle of inclination θ of the ridge of long piece 32 be 1° or greater.

Moreover, it is also desirable that each convexity 36 of the concavities and convexities along the first direction have the approximate shape of a triangle asymmetrical with respect to its right and left sides. In other words, it is preferable to provide convexity 36 with a shape such that the ratio $r_2/r_1$ between the angle $r_2$ and angle $r_1$ which are formed when a vertical line is extended downward from the apex of convexity 36 does not equal 1. A variety of shapes are possible for convexity 36, including a shape similar to a sin wave, a segmental arch shape, a triangle shape or the like. In the case where convexity 36 is triangularly shaped, the apex may be rounded or cut off to provide a flat surface. When convexity 36 is shaped like a triangle, it is preferable that the ratio $r_2/r_1$ be 1.2 or greater.

Figure 5:
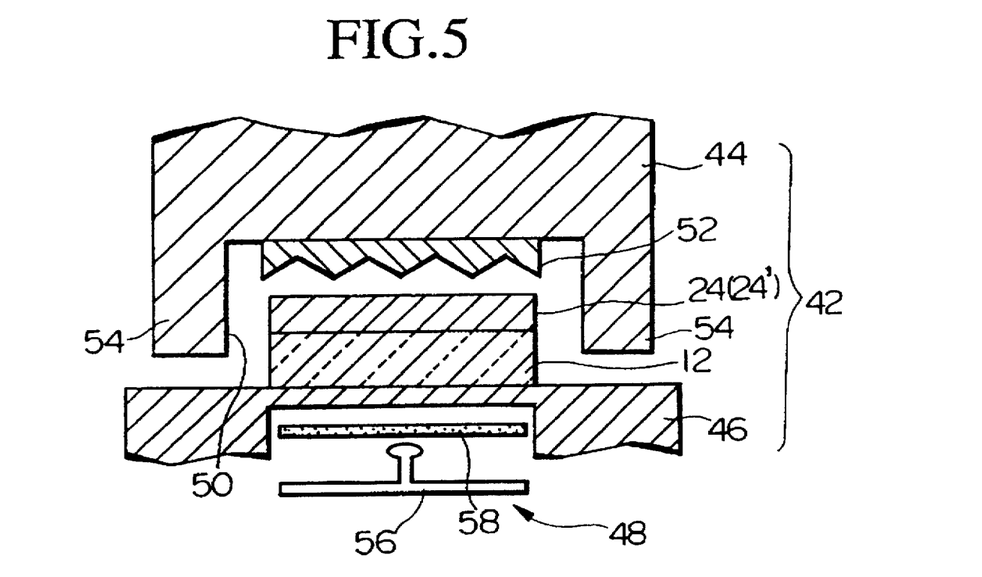
FIG. 5 is a lateral view showing an example of a device for producing alignment film.

A production device such as that shown in FIG. 5 may be used when a transfer method is employed.

Production device 42 shown in FIG. 5 is comprised in the main of a pedestal 46, serving as a holding mechanism for base 12; an upper plate 44, serving as a transfer mechanism provided above pedestal 46 in a manner so as to move freely in the vertical direction; and a UV irradiating equipment 48.

Pedestal 46 is provided for disposing base 12. A smooth high molecular compound film 24' is formed to the upper surface of base 12 that is disposed on top of pedestal 46, prior to formation of the concavities and convexities to the surface thereof.

Upper plate 44, the transfer mechanism, is moved up and down vertically by means of a movement mechanism, not shown in the figures, to apply pressure to high molecular compound film 24'. A concavity 50 is formed to the bottom surface of upper plate 44 into which transfer mold 52 attaches. Additionally, the pattern of concavities and convexities which is to be formed to the upper surface of alignment film 24 is formed to the bottom surface of transfer mold 52.

An outwardly projecting stopper 54 is formed about the periphery of concavity 50. When this stopper 54 comes in contact with the upper surface of pedestal 46, the descent of Upper plate 44 is halted. Accordingly, when stopper 54 of upper plate 44 comes in contact with the upper surface of pedestal 46, the descent of upper plate 44 is halted, and the advance of transfer mold 52 with respect to high molecular compound film 24' is stopped. In this way, a pattern of concavities and convexities of a regular depth is formed to the Upper surface of high molecular compound film 24'.

Further, polarized UV irradiating equipment 48, which is provided with a UV light source 66 for emitting UV and a polarizer 58 which polarizes the UV light irradiated from UV light source 56, irradiates high molecular compound film 24' with polarized UV.

In order to produce alignment film employing this production device 42, base 12, on which a high molecular compound film 24' consisting of the unique compound of the present invention is formed, is disposed on pedestal 46. Next, upper plate 44 is lowered. This causes transfer mold 52 to press into the upper surface of high molecular compound film 24', thereby transferring the pattern of concavities and convexities on the bottom surface of transfer mold 52 to the upper surface of high molecular compound film 24'. Thus, an alignment film 24 is obtained on which a pattern of concavities and convexities such as shown in FIGS. 2 and 3 is formed.

Then, polarized UV is irradiated by polarized UV irradiating equipment 48 along the second direction of the concavities and convexities pattern formed on the high molecular compound film, causing the film to harden.

Preparation of Polyvinyl-4-(4-fluorobenzyloxy) cinnamate

An example of the preparation of polyvinyl-4-(4-fluorobenzyloxy)cinnamate will now be shown, this being the compound which results when X in the compound shown by the preceding chemical formula (2) represents F.

First, 500 ml of dimethylformamide, 12.2 g (0.10 mol) of 4-hydroxybenzaldehyde and 41.4 g (0.30 mol) of potassium carbonate were placed into a 1 liter flask which had three openings and was provided with a cooling tube and a stirrer, and stirred at room temperature.

Then, 17.4 g (0.12 mol) of 4-fluorobenzyl chloride was added, and stirred vigorously at 100° C.

After allowing the reaction to continue for 10 hours, the solution was added to 2 liters of water, and was extracted with 1.5 liters of ethyl acetate.

The organic layer was then washed with 3N hydrochloric acid and saturated solution of NaCl.

The obtained ethyl acetate layer was dried with anhydrous sodium sulfate, and the solvent was removed under reduced pressure to obtain crystals. The crystals were recrystalized twice with ethanol to obtain 18.2 g (0.079 mol) of 4-(4-fluorobenzyloxy)benzaldehyde.

The melting point of the obtained compound was 97.3° C. to 98.7° C.

solved in tetrahydrofuran and reprecipitated with methanol to obtain 5.21 g of polyvinyl-4-(4-fluorobenzyloxy) cinnamate.

The preceding reaction is represented by the following chemical reaction equation (5).

[chemical reaction equation 5]

The preceding reaction is represented by the following chemical reaction equation (4), where X is F.

[chemical reaction equation 4]

Next, 200 ml of pyridine was placed inside a 500 ml flask which had three openings and was provided with a cooling tube and a stirrer. To this was added 11.5 g (0.050 mol) of the 4-(4-fluorobenzyloxy)benzaldehyde prepared above, and 10 ml of piperidine, followed by stirring at room temperature to dissolve.

Malonic acid was then added in the amount of 6.25 g (0.060 mol), followed by heating and refluxing for 5 hours.

Following completion of the reaction, the solution was added to 1 liter of water, and the pH was brought to 1 using 6N hydrochloric acid The precipitated crystals were filtered and collected, and recrystalized twice with ethanol to obtain 7.34 g (0.027 mol) of 4-(4-fluorobenzyloxy)cinnamate.

The melting point of this compound was 216.7° C.

7.34 g (0.027 mol) of 4-(4-fluorobenzyloxy)cinnamate and 15.0 ml of oxalyl chloride were placed in a 100 ml flask that was provided with a cooling tube, and allowed to react for 4 hours at 70° C. The excess oxalyl chloride was removed under reduced pressure, to obtain 4-(4-fluorobenzyloxy)cinnamoyl chloride. After confirming the compound's structure with IR and NMR, it was immediately used in the following reaction.

30 ml of pyridine and 0.88 g of polyvinyl alcohol (average molecular weight: 40,000) were placed in a 100 ml flask which had three openings and was provided with a cooling tube and a stirrer, and stirred at room temperature. Then 6.97 g (0.024 mol) of the 4-(4-fluorobenzyloxy)cinnamoyl chloride prepared above was added, followed by stirring for 10 hours at 50° C.

After completion of the reaction, the solution was added dropwise to diluted hydrochloric acid, and the precipitated polymer was filtered and collected. This polymer was dis- The structure of this polymer was confirmed with IR and NMR. The melting point was from 107.2° to 129.5° C. The glass transition temperature was 92.5° C. and the decomposition temperature was 294.3° C.

Preparation of Polyvinyl-4-(4-chlorobenzyloxy) cinnamate

An example of the preparation of polyvinyl-4-(4-chlorobenzyloxy)cinnamate will now be shown, this being the compound which results when X in the compound shown by the preceding chemical formula (2) represents Cl.

With the exception that 4-chlorobenzyl chloride was used in place of 4-fluorobenzyl chloride: polyvinyl-4-(4-chlorobenzyloxy)cinnamate was obtained by a process identical to that for producing polyvinyl-4-(4-fluorobenzyloxy) cinnamate. The obtained compound had a melting point of 117.3° C. to 145.6° C., a glass transition temperature of 90.2° C., and a decomposition temperature of 303.3° C.

EXPERIMENTAL EXAMPLE 1

3% by weight of polyvinyl-4-(4-fluorobenzyloxy) cinnamate was dissolved in the solvent γ-butyrolaotone.

Then, using offset printing, this solution was uniformly coated to the washed surface of a glass base on which an ITO electrode was formed. Following heating at 80 ° C. for 1 minute, the glass base was heated for 1 hour at 180° C. to dry the coating by vaporizing the solvent. In this way, a film consisting of a high molecular compound was formed.

Next, the film on this base was irradiated for 10 minutes with polarized UV (5 mW) having a wavelength of 310 nm, to produce a base with an alignment film formed thereto.

Additionally, during irradiation with UV, the base was heated at 90° C. to 100° C. with the quenching ratio of the polarizing prism being $10^{-5}$ and the energy density of the irradiation being 1.5 J/cm$^2$.

The two bases produced by means of this process were placed in opposition to one another via a spacer, and liquid crystal (K-15 manufactured by Merck & Co., Inc.) was injected there between. The space between the bases was 10 μm.

A heat treatment was again carried out, to produce an LCD component.

A voltage was impressed on the ITO in this LCD component to measure LC alignment.

The results indicated a uniform alignment with almost no domains.

EXPERIMENTAL EXAMPLE 2

With the exception that polyvinyl-4-(4-chlorobenzyloxy) cinnamate was used in place of polyvinyl-4-(4-fluorobenzyloxy)cinnamate, experimental samples of LCD components were prepared in the same way as in Experimental Example 1, and the alignments were measured.

The results indicated a uniform alignment with almost no domains.

EXPERIMENTAL EXAMPLE 3

3% by weight of polyvinyl-4-(4-fluorobenzyloxy) cinnamate was dissolved in the solvent γ-butyrolactone.

Then, as in Experiment Example 1, offset printing was used to uniformly coat this solution to the washed surface of a glass base on which an ITC electrode was formed.

Following heating at 80° C. for 1 minute, the glass base was heated for 1 hour at 180° C. to dry the coating by vaporizing the solvent. In this way, a film consisting of a high molecular compound was formed.

Next, the film on this base was irradiated for 10 minutes with polarized UV (5 mW) having a wavelength of 310 nm, to produce a base with an alignment film formed thereto.

Additionally, during irradiation with UV, the base was heated at 80° C., with the quenching ratio of the polarizing prism being $10^{-5}$ and the energy density of the irradiation being 1.5 J/cm².

The two bases produced by means of this process were placed in opposition to one another via a spacer, and liquid crystal (K-15 manufactured by Merck Co.) to which 1% by weight of a dichromatic dye (LSB-278 manufactured by Mitsubishi Chemical Corp.) had been added was injected there between. The space between the bases was 10 μm.

A heat treatment was again carried out, to produce an LCD component.

A polarizing board was disposed to one side of the cell in this LCD component, and the cell was rotated to measure the transmissivity and the dichromatic ratio, which is the ratio of the minimum absorbance to the maximum absorbance.

Measurements revealed a dichromatic ratio of 10.

Additionally, for comparative purposes, when an alignment film is produced using polyvinyl-p-methyoxycinnamate, the LCD component displays only small contrast with a maximum dichromatic ratio is 5. Accordingly, in the case of the LCD component of the present example, the dichromatic ratio is high, and there is sufficient alignment of the liquid crystals.

EXPERIMENTAL EXAMPLE 4

With the exception that polyvinyl-4-(4-chlorobenzyloxy) cinnamate was used in place of polyvinyl-4-(4-fluorobenzyloxy)cinnamate, experimental samples of LCD components were prepared in the same way as in Experimental Example 3, and the dichromatic ratios were measured.

The results indicated a dichromatic ratio of 10. Thus, it may be understood that the LCD components of this example have a high dichromatic ratio, with sufficient alignment of the liquid crystals.

What is claimed:

1. A UV crosslinking compound represented by the following chemical formula:

wherein, n is an integer, and X is an atom selected from among F, Cl, Br, Z and CN.

2. A LCD alignment film consisting of a high molecular compound represented by the following chemical formula:

wherein, n and n' are integers, and X is an atom selected from among F, Cl, Br, I and CN.

3. A LCD component provided with an alignment film comprising a high molecular compound represented by the following chemical formula:

wherein, n and n' are integers, and X is an atom selected from F, Cl, Br, I and CN.

* * * * *